(12) United States Patent
Oishi et al.

(10) Patent No.: US 6,688,576 B2
(45) Date of Patent: Feb. 10, 2004

(54) DISPLAY APPARATUS

(75) Inventors: Toshiharu Oishi, Shizuoka-ken (JP);
Sadao Yokoi, Shizuoka-ken (JP);
Daisuke Takao, Shizuoka-ken (JP);
Koichi Kaneko, Shizuoka-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/105,162

(22) Filed: Mar. 26, 2002

(65) Prior Publication Data

US 2002/0153836 A1 Oct. 24, 2002

(30) Foreign Application Priority Data

Apr. 23, 2001 (JP) ........................................ 2001-124330

(51) Int. Cl.[7] .......................... F16M 13/00; G09G 3/10
(52) U.S. Cl. .................................... 248/917; 315/169.3
(58) Field of Search ........................ 315/169.1, 169.2, 315/169.3; 361/681, 725, 726; 248/919, 917, 918

(56) References Cited

U.S. PATENT DOCUMENTS

| | | | |
|---|---|---|---|
| 5,583,529 A | * 12/1996 | Satou | ........................ 345/87 |
| 6,421,231 B1 | * 7/2002 | Jung | ........................ 361/681 |
| 6,445,373 B1 | * 9/2002 | Yamamoto | ................. 345/102 |
| 6,504,706 B2 | * 1/2003 | Stewart | ...................... 361/681 |

* cited by examiner

*Primary Examiner*—Don Wong
*Assistant Examiner*—Minh D A
(74) *Attorney, Agent, or Firm*—Arent Fox Kintner Plotkin & Kahn, PLLC

(57) ABSTRACT

A display panel of the display apparatus is encompassed by a front case from the front and by a rear case from the back. The display apparatus includes a first attachment structure capable of attaching/detaching the front case on the front side, and a second attachment structure A formed on the four corners of the rear case for attaching the display apparatus to the wall. The attachment operation for attaching the display apparatus to the wall is performed while the front case is detached. After the completion of attaching the display apparatus on the wall, the front case is attached by way of the first attachment structure to prevent the second attachment structure A from being exposed to the front.

3 Claims, 2 Drawing Sheets

DISPLAY APPARATUS

BACKGROUND OF THE INVENTION

1. Field of the Invention

This invention relates to display apparatuses using a flat display panel and, more particularly, to a display apparatus having an installation structure capable of attaching on a wall thereof a flat display panel such as a plasma display panel, a liquid crystal display panel, an organic EL display panel, a field emission display (FED) panel, or the like.

The present application claims priority from Japanese Application No. 2001-124330, the disclosure of which is incorporated herein by reference for all purposes.

2. Description of the Related Art

A flat display panel such as a plasma display panel, a liquid crystal display panel, an organic EL display panel, a field emission display (FED) panel, or the like is attached together with a control circuit board to a chassis serving as a heat-dissipating plate or a supporting plate, and sandwiched between a front case and a rear case to be encompassed therebetween to form a display apparatus.

Such a display apparatus has been proved to be quit effective in use since it is thin in its thickness and thus makes it possible to make full use of room space when it is placed within a room. Conventionally, such a display apparatus is fixed on a wall by means of specific attachment brackets. The attachment bracket is screwed to the back face of the display apparatus and then is secured to the wall by screws. Alternatively, the attachment bracket is first secured to the wall by screws and then is coupled to the display apparatus by screws or the like.

In this way, when the back face of the display apparatus serves as a attachment face to be fixed to the wall by the use of the attachment bracket, a space is needed for interposing the attachment bracket and coupling parts, such as screws or the like for use in securing the attachment bracket, between the back face of the display apparatus and the wall. In addition, it is necessary to provide a space for performing the attachment operation. Hence, the display apparatus cannot be placed in contact with the wall in attachment operation, which makes it impossible to effectively use an advantage of saving space by virtue the thin-type display apparatus. Further, the attachment operation itself is carried out in extremely confined space, resulting in an impaired workability.

In one possible way for fixing the display apparatus to the wall without the use of the attachment bracket, a wall may be drilled to mount the display apparatus from the reverse side of the wall. This way, however, is often avoided because it needs a large-scale attachment operation leading to an increase in costs and great damage to a house.

In another possible attachment structure, the attachment bracket can be fastened to the display apparatus in such a manner as to extend from behind the display apparatus outward along a wall. However, this structure causes a fixing portion of the attachment bracket to be visible from the front of the display apparatus, resulting in the problem of impairment in visible appearance.

SUMMARY OF THE INVENTION

The present invention has been proposed for coping with the above circumstances, and therefore an object of the present invention is to provide a display apparatus achieving improvements in the space saving, workability and visible appearance when a thin-type display apparatus is fixed to a wall.

To attain the above object, a display apparatus according to the present invention is equipped with the following features.

In a first aspect of the present invention, there is provided a display apparatus including a quadrangular flat display panel, a front case, and a rear case teaming up with the front case to encompass the flat display panel, said apparatus comprising: a first attachment structure for attaching and fastening the front case from the front side of the display apparatus; and a second attachment structure provided at corners of said rear case, facing the back face of said front case, for fixing the display apparatus to a wall from the front side of the display apparatus.

In a second aspect of the present invention, based on the display apparatus described in the first aspect, the feature is that the second attachment structure is formed at the four corners of said rear case.

In a third aspect of the present invention, based on the display apparatus described in the first aspect, the feature is that it further comprises a reinforce plate fastened to the back face of said rear case for fixing the display apparatus to the wall, in a manner such that the reinforce plate is interposed between the rear case and the wall.

The display apparatus having such features yields the following operation and effects.

With each of the above-described configurations, the display apparatus is fixed to the wall from the front side of the display apparatus by means of the second attachment structure provided at the corners of the rear case in the condition that the front case has been detached. Attaching the front case from the front side by means of the first attachment structure allows the second attachment structure, provided in the corners of the rear case, to hide behind the front case. Accordingly, the display apparatus can be mounted on the wall in the condition that the back face of the display apparatus (the back face of the rear case) is in contact with the wall surface. Further, since the attachment operation for attaching the display apparatus to the wall is performed from the front of the display apparatus, the workability is improved. Still further, the second attachment structure hidden by attaching the front case, resulting in an improved visible appearance.

In addition to the above effects, the provision of the second attachment structure in the corners of the rear case allows stabilization of the fixing to the wall. The reinforce plate is provided on the back face of the rear case, and the display apparatus is fixed to the wall through the reinforce plate, resulting in the firm fixing with durability.

The configuration of the present invention as described above, allows an achievement of an effective space saving, an improvement in workability and visible appearance, and a reduction in costs for the attachment operation when a display apparatus having a flat display panel is attached to the wall.

These and other objects and advantages of the present invention will become obvious to those skilled in the art upon review of the following description, the accompanying drawings and appended claims.

DETAILED DESCRIPTION OF THE PREFERRED EMBODIMENT

A preferred embodiment according to present invention will be described below with reference to the accompanying drawings. The embodiment describes a plasma display panel (PDP) only by way of example, but the present invention is not limited thereto and is applicable to other types of flat display panels such as liquid crystal display panels, organic EL display panels, field emission display (FED) panels and the like.

Figure 1:
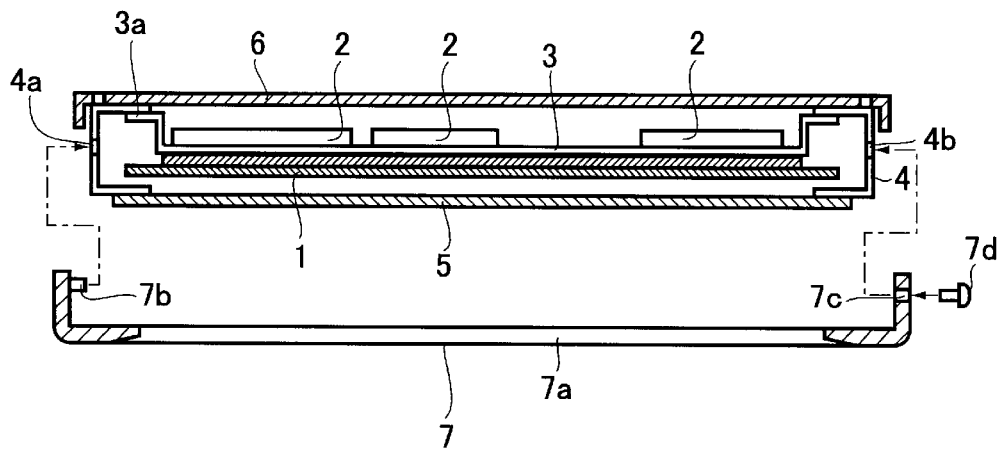
FIG. 1 is an explanatory drawing for illustrating a construction of a display apparatus according to the present invention, which shows a sectional view taken along the x-x line in FIG. 2.
Figure 2:
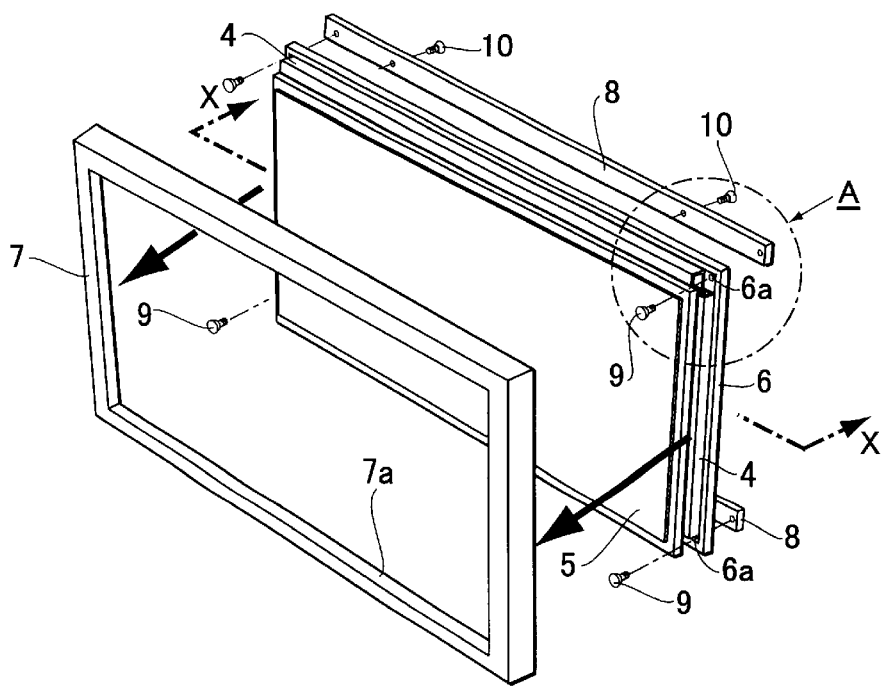
FIG. 2 is an explanatory drawing for illustrating a attachment structure of the display apparatus according to the present invention.

FIG. 1 is an explanatory drawing for illustrating a construction of a display apparatus according to the present invention, which shows a sectional view taken along the x—x line in FIG. 2. The display apparatus includes a quardrangular plasma display panel 1 which is made up by bonding two glass substrates (front substrate and back substrate) together with a discharge space formed therebetween. Then, the plasma display panel 1 and circuit boards 2 for driving the PDP 1 are integrally formed, with a chassis 3 interposed therebetween.

The chassis 3 is a plate-shaped member made of a metal such as aluminum or the like, which serves as a support member for supporting the plasma display panel 1 and the circuit board 2 on its front and back surfaces, and also serves as a heat dissipation member due to its high thermal conductivity.

The plasma display panel 1 is electrically connected to the circuit board 2 by a flexible cable (not shown). The chassis 3 is fastened to the back face (outside surface of the back substrate) of the plasma display panel 1 by use of double-faced adhesive tapes (not shown).

A supporter 3a bent into an L shape is formed on each of the four sides of the chassis 3, and is fastened to an end portion of a C-shaped side frame 4 by a plurality of fixing screws. The other end portion of the side frame 4 is fastened to a transparent protection panel 5 positioned so as to cover the front face of the display panel.

Such a display apparatus has a construction of encompassing the above plasma display panel 1 with a rear case 6 and a front case 7. The front case 7 is a housing member for covering the protection panel 5 and side frame 4 from the front side, and has a front face in which a viewing opening 7a for the display panel is formed, one side portion on which a hook 7b is provided, and the other side portion on which a attachment hole 7c is provided. The hook 7b, the attachment hole 7c, the corresponding engaging hole 4a and screw hole 4b which are respectively provided in side faces of the side frame 4, and a attachment screw 7d together form a first attachment structure. The rear case 6 is a housing member for covering the side frame 4 from the back side of the display apparatus, and is fastened to the back face of the side frame 4 by a fastening member such as screws or the like.

Figure 3:
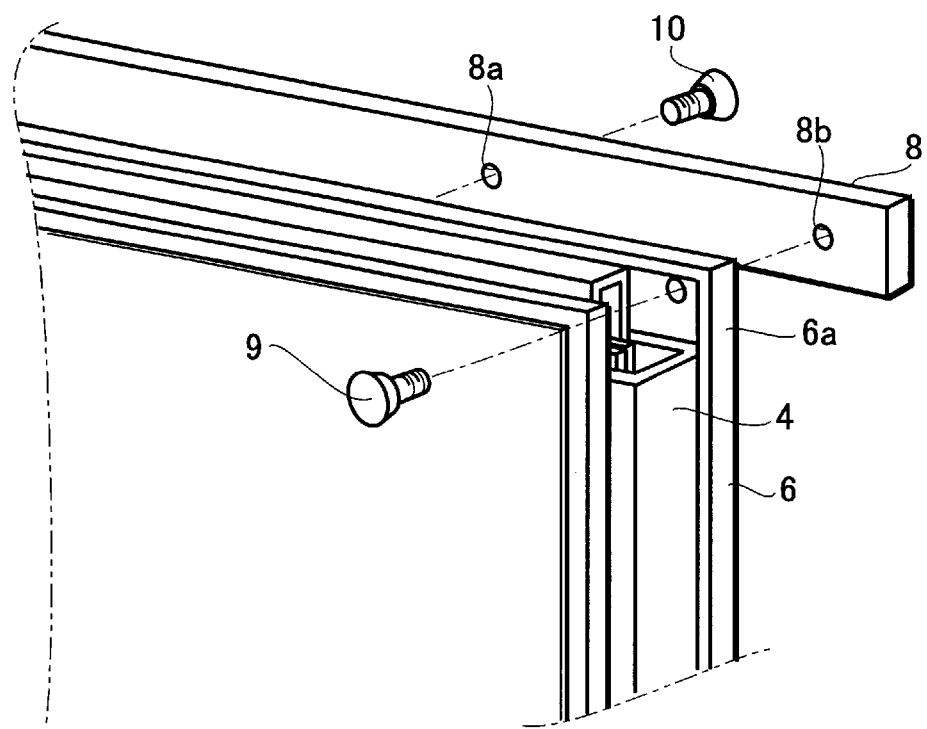
FIG. 3 is an explanatory drawing for specifically illustrating an enlarged part of the attachment structure in FIG. 2.

FIG. 2 and FIG. 3 are explanatory drawings for illustrating the attachment structure of the display apparatus of the present invention. As to the attachment structure in the front case 7, the above hook 7b is engaged with the engaging hole 4a of the side frame 4, then the attachment hole 7c is aligned with the screw hole 4b of the side frame 4 and then the attachment screw 7d is tightened in the holes 7c and 4b. Thus the front case 7 is attached from the front side of the display apparatus. The front case 7 is easily detachable by removing the attachment screw 7d and hook 7b, After the front case 7 is detached from the display apparatus in the direction of the arrows illustrated in FIG. 2, the display apparatus is mounted on a wall. For attaching the display apparatus on the wall, the rear case 6 includes a second attachment structure A, which will be described in detail below with reference to FIG. 3. Attachment holes 6a are respectively formed in the four corners of the rear case 6. In the front of each attachment hole 6a, a space is provided for smoothly tightening a screw from the front of the display apparatus under a condition that the front case 7 has been detached. On the back face of the rear case 6, a reinforcing plate 8 is attached, if necessary, by inserting a screw 10 into the attachment hole 8a to reach the back face of the rear case 6 and screwing it down. Regarding the screw 10, it is desirable to use a flat head screw or to form a countersink or recess on the back face of the reinforcing plate 8 in such a manner that the head of the screw fits flush with the surface. Then, from the front side of the display apparatus, a attachment screw 9 is inserted into a attachment hole 6a of the rear case 6 and a attachment hole 8b of the reinforce plate 8 to reach the wall surface, and screwed down for fixing the display apparatus to the wall.

After the completion of fixing the display panel apparatus to the wall, the front case 7 is attached by means of the aforementioned first attachment structure to cover the front of the display apparatus. Hence the aforementioned second attachment structure A is hidden behind the front case 7. In this way, the attachment structure can avoid being exposed to the front of the display apparatus, thereby avoiding an impairment of the visible appearance.

In other words, the display apparatus having the aforementioned structure can be fixed to the wall without forming a space between the back face of the rear case 6 and the wall, even if the thin reinforce plate 8 is used as necessary. For this reason, the advantages of the thin-type display apparatus can be practically used to achieve the space saving. Further, when the front case 7 is detached, an adequate working space can be ensured on the front side of the second attachment structure, which allows an improvement in the workability of attaching/detaching and cleaning or repairing the display apparatus. The structure in which the front case 7 is attached to the front after the display apparatus is fixed to the wall to prevent the second attachment structure A from exposing to the front, provides a visible appearance in such a manner that the display apparatus appears to have adhered to the wall with an excellent interior decoration effect. Still further, since a large-scale installation operation is not specially needed, it is possible to greatly reduce the cost needed in installing the display apparatus on the wall.

With the use of the present invention having the above-described construction, when a display apparatus having a flat display panel is attached on to the wall, it is allowed to save space within a room, ensure an good operability in installation, a good visible appearance, and a low installation cost.

The terms and description used herein are set forth by way of illustration only and are not meant as limitations. Those skilled in the art will recognize that numerous variations are possible within the spirit and scope of the invention as defined in the following claims.

What is claimed is:

1. A display apparatus including a quadrangular flat display panel, a front case, and a rear case teaming up with the front case to encompass the flat display panel, said apparatus comprising:
   a first attachment structure for attaching and fastening the front case from the front side of the display apparatus; and a second attachment structure provided at corners of said rear case, facing the back face of the said front case, adapted to fix the display apparatus to a wall from the front side of the display apparatus.

2. A display apparatus according to claim 1, wherein said second attachment structure is formed at the four corners of said rear case.

3. A display apparatus according to claim 1, further comprising a reinforce plate fastened to the back face of said rear case adapted to fix the display apparatus to the wall, in a manner such that the reinforce plate is interposed between the rear case and the wall.

* * * * *